United States Patent [19]

Tukey et al.

[11] Patent Number: 5,787,420
[45] Date of Patent: *Jul. 28, 1998

[54] METHOD OF ORDERING DOCUMENT CLUSTERS WITHOUT REQUIRING KNOWLEDGE OF USER INTERESTS

[75] Inventors: John W. Tukey, Princeton, N.J.; Jan O. Pedersen, Palo Alto, Calif.

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 572,558

[22] Filed: Dec. 14, 1995

[51] Int. Cl.$^6$ ........................... G06F 17/30
[52] U.S. Cl. ............... 707/5; 707/2; 707/4; 364/225.6
[58] Field of Search ..................... 395/600, 605; 707/2, 4, 5; 364/225.6

[56] References Cited

U.S. PATENT DOCUMENTS

| | | | |
|---|---|---|---|
| 5,050,071 | 9/1991 | Harris et al. | 364/200 |
| 5,317,507 | 5/1994 | Gallant | 364/419.13 |
| 5,325,298 | 6/1994 | Gallant | 364/419.19 |
| 5,418,951 | 5/1995 | Damashek | 395/600 |
| 5,442,778 | 8/1995 | Perdersen et al. | 395/600 |
| 5,483,650 | 1/1996 | Perdersen et al. | 395/600 |
| 5,535,382 | 7/1996 | Ogawa | 395/600 |
| 5,576,954 | 11/1996 | Driscoll | 395/603 |

OTHER PUBLICATIONS

Cutting, Douglass R. et al. "Constant Interaction–Time Scatter/Gather Browsing of Very Large Document Collections," *Proceedings of the Sixteenth Annual International ACM SIGIR Conference on Research and Development in Information Retrieval*, Pittsburgh, PA, Jun. 27–Jul. 1, 1993, pp. 126–134.

Cutting, Douglass, R. et al. "Scatter/Gather: A Cluster–based Approach to Browsing Large Document Collections," *Proceedings of the Fifteenth Annual International ACM SIGIR Conference on Research and Development in Information Retrieval*, Copenhagen, Denmark, Jun. 21–24, 1992, pp. 318–329.

Dantzig, George B. "A Comment on Edie's 'Traffic Delays at Toll Booths'," Journal of Operations Research Society of America, vol. 2, 1954, pp. 339–341.

The Traveling Salesman Problem: A Guided Tour of Combinatorial Optimization. Edited by E.L. Lawler et al. John Wiley & Sons Ltd., New York, 1985, pp. 87–143.

*Primary Examiner*—Thomas G. Black
*Assistant Examiner*—Jean M. Corrielus
*Attorney, Agent, or Firm*—Tracy L. Hurt

[57] ABSTRACT

A computerized method of ordering document clusters for presentation after browsing a corpus of documents that presents document clusters in a logical fashion in the absence of any indication of the computer user's interests. The method begins by grouping the corpus into a plurality of clusters, each having a centroid and including at least one document. Next, for each cluster a degree of similarity between that cluster and every other cluster is by finding a dot product between each cluster centroid and every other cluster centroid. The similarity information is then used to determine an order of presentation for the plurality of in a way that maximizes the degree of similarity between adjacent clusters.

11 Claims, 6 Drawing Sheets

METHOD OF ORDERING DOCUMENT CLUSTERS WITHOUT REQUIRING KNOWLEDGE OF USER INTERESTS

FIELD OF THE INVENTION

The present invention relates to a method of document clustering. In particular, the present method relates to a method of logically ordering document clusters for presentation a computer user in the absence of indications of user interests.

BACKGROUND OF THE INVENTION

Until recently the conventional wisdom held that document clustering was not a useful information retrieval tool. Objections to document clustering included its slowness with large document corpora and its failure to appreciably improve retrieval. However, when used as an access tool in its own right, document clustering, often repeated stage after stage, can be a powerful technique for browsing and searching a large document corpus. Pedersen et al. describe such a document browsing technique in U.S. Pat. No. 5,442,778, entitled "Scatter-Gather: A Cluster-Based Method and Apparatus for Browsing Large Document Collections."

Using document clustering stage after stage as its centerpiece, the Scatter-Gather method disclosed by Pedersen et al. enables information access for those with non-specific goals, who may not be familiar with the appropriate vocabulary for describing the topic of interest, or who are not looking for anything they are able to specify, as well as for those with specific interests. Scatter-Gather does so by repeatedly scattering the documents of the current collection and then gathering them into clusters and presenting summaries of the clusters to the user. Given this initial grouping the user may select one or more clusters, whose documents become a new subcorpus. Additionally, the user may add or eliminate documents from this sub-corpus, as desired, to facilitate a well-specified search or browsing. The documents of this modified sub-corpus are again scattered and then gathered into new clusters. With each iteration, the number of documents in each cluster becomes smaller and their mutual similarity more detailed.

Figure 1:
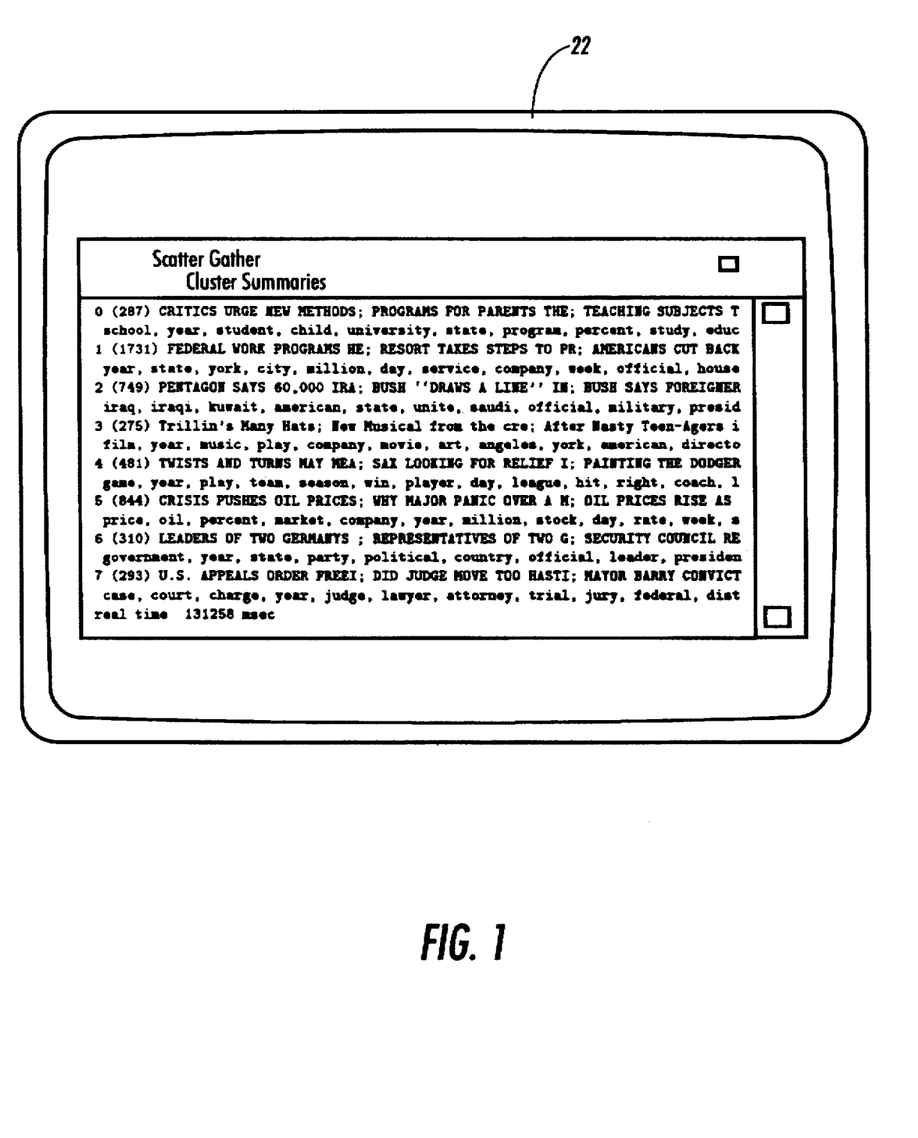
FIG. 1 illustrates a prior disorderly cluster summaries for presentation.

FIG. 1 illustrates an exemplary presentation and ordering of cluster summaries on a computer screen, which were generated for an initial scattering of a corpus consisting of the August 1990 articles provided by the New York Times News Service. The first line of each cluster summary includes the cluster number, the number of documents in the summary, and a number of partial typical titles of articles within the cluster. The second line of each cluster summary lists words frequent within the cluster. While useful, these cluster summaries are not as helpful as the table of contents of a conventional textbook because their order of presentation does not indicate any relationship or similarity between adjacent clusters.

As FIG. 1 illustrates, clusters need not be presented to the user for consideration one at a time. However, there are limitations to how many clusters can be presented at a single time on a computer screen. The limitations of display device dimensions and the user's short term memory determine an upper limit on how may clusters can be usefully presented at once. If the number of clusters at a particular stage of a particular search exceeds this upper limit, it is possible and often desirable to group those clusters into fewer super-clusters, replacing what would have been one search stage by two search stages.

SUMMARY OF THE INVENTION

A computerized method of ordering document clusters for presentation after browsing a corpus of documents will be described that orders and presents document clusters in a logical fashion in the absence of any indication of the computer user's interests. The method begins by grouping the corpus into a plurality of clusters, each having a centroid and including at least one document. Next, for each cluster a degree of similarity between that cluster and every other cluster is by finding a dot product between each cluster centroid and every other cluster centroid. The similarity information is then used to determine an order of presentation for the plurality of in a way that maximizes the degree of similarity between adjacent clusters.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 2:
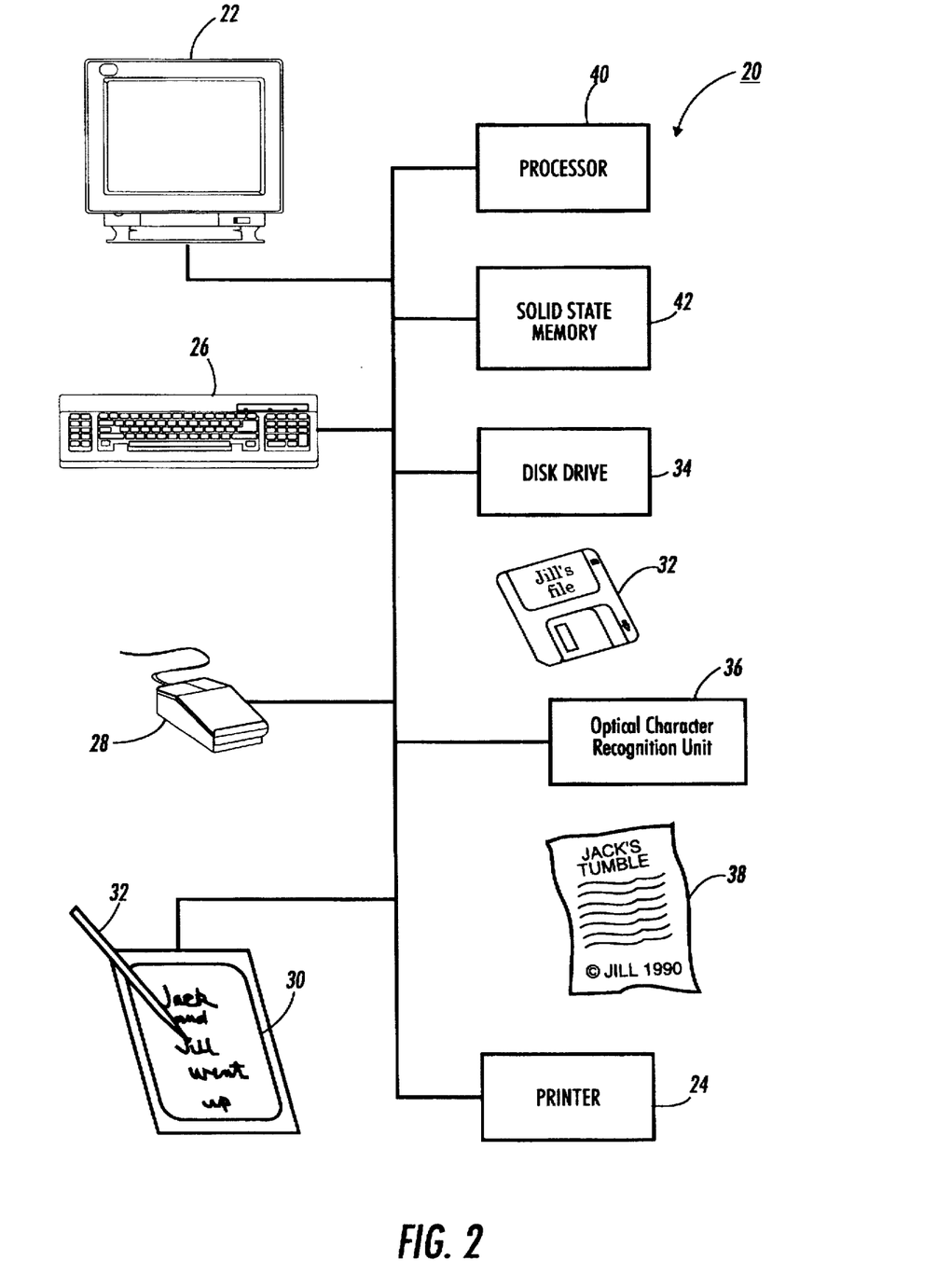
FIG. 2 illustrates a computer system for ordering document clusters for presentation.

FIG. 2 illustrates computer system 20, which incorporates the method of the present invention for ordering document clusters for presentation. Briefly described, the method of the present invention enables computer system 20 to automatically order document clusters for presentation to a computer user in a logical and useful fashion in the absence of any indication from the computer user of her interests. Computer system 20 does so by finding the degree of similarity between each cluster and every other cluster. In one embodiment, computer system 20 orders the clusters so that the degree of similarity between adjacent clusters is maximized. In a second embodiment, computer system 20 orders the clusters so that the degree of similarity between distant clusters in the ordering is kept large. When the number of clusters is large, this embodiment greatly reduces the chance that two widely separated clusters in the order will be similar.

A. The Document Clustering Computer System

Prior to a more detailed discussion of the present invention, consider computer system 20. Computer system 20 includes monitor 22 for visually displaying information to a computer user. Computer system 20 also outputs information to the computer user via printer 24. Computer system 20 provides the computer user multiple avenues to input data. Keyboard 26 and mouse 28 allow the computer user to input data manually. The computer user may also input information by writing on electronic tablet 30 with pen 32. Alternately, the computer user can input data stored on machine readable media 32, such as a floppy disk, by inserting machine readable media into disk drive 34. Optical character recognition unit (OCR unit) 36 permits users to input hard copy natural language documents, like document 38, which it converts into a coded electronic representation, typically American National Standard Code for Information Interchange (ASCII).

Processor 40 controls and coordinates the operation of computer system 20 to execute the commands of the computer user. Processor 40 determines and takes the appropriate action in response to each command by executing instructions stored electronically in memory, either memory 42 or on floppy disk 32 within disk drive 34. Typically, operating instructions for processor 40 are stored in solid state memory 42, allowing frequent and rapid access to the instructions. Devices that can be used to implement memory 42 include standard, commercially available semiconductor logic devices such as read only memories (ROM), random access memories (RAM), dynamic random access memories (DRAM), programmable read only memories (PROM), erasable programmable read only memories (EPROM), and electrically erasable programmable read only memories (EEPROM), such as flash memories.

B. Document Clustering

The documents of a corpus must be clustered before the order of presentation of the clusters can be determined. The clusters at each stage of a search may have been precomputed, allowing their use in many other computer searches, or the clustering at each stage may be performed "on the fly." The most reasonable approach in many situations is to precompute the clusters for early stages and to compute the clusters in the later stages "on the fly."

This clustering may be done using a variety of techniques, including those described in U.S. Pat. No. 5,442,778 to Pedersen et al., which is incorporated herein by reference. Typically, clustering algorithms represent each document d of a corpus C using an appropriate lexicon, V. The appropriate lexicon will often utilize gentle stemming; i.e., combinations of words that differ by simple suffixes become a single term, and usually excludes words found on an extended list of stop words. As used herein, stop words are words that do little to change the topics of the sentences in which they appear. A suitable lexicon may also include selected word pairs and might differ from stage to stage of a search.

Some clustering algorithms use a countfile, c(d), to represent each document. In a countfile each scalar represents the number of times each term of the appropriate lexicon, V, occurs in document, d.

A countfile can be expressed as:

$$c(d) = \{f(\omega_i, d)\} \text{ for } i=1 \text{ to } |V|$$

where:

$\omega_i$ is the ith term in lexicon V; and $f(\omega_i, d)$ represents the frequency of the term $\omega_i$ in document d.

While the countfile includes desirable information beyond the presence or absence of the terms of the lexicon being used, another function, $\phi(d)$, often conveys more useful information. The function $\phi(d)$ at first increases rapidly with its argument, d, and then more slowly, and defines a profile, $\rho(d)$. This profile is expressed as:

$$\rho(d) = \phi(c(d)).$$

Figure 3:
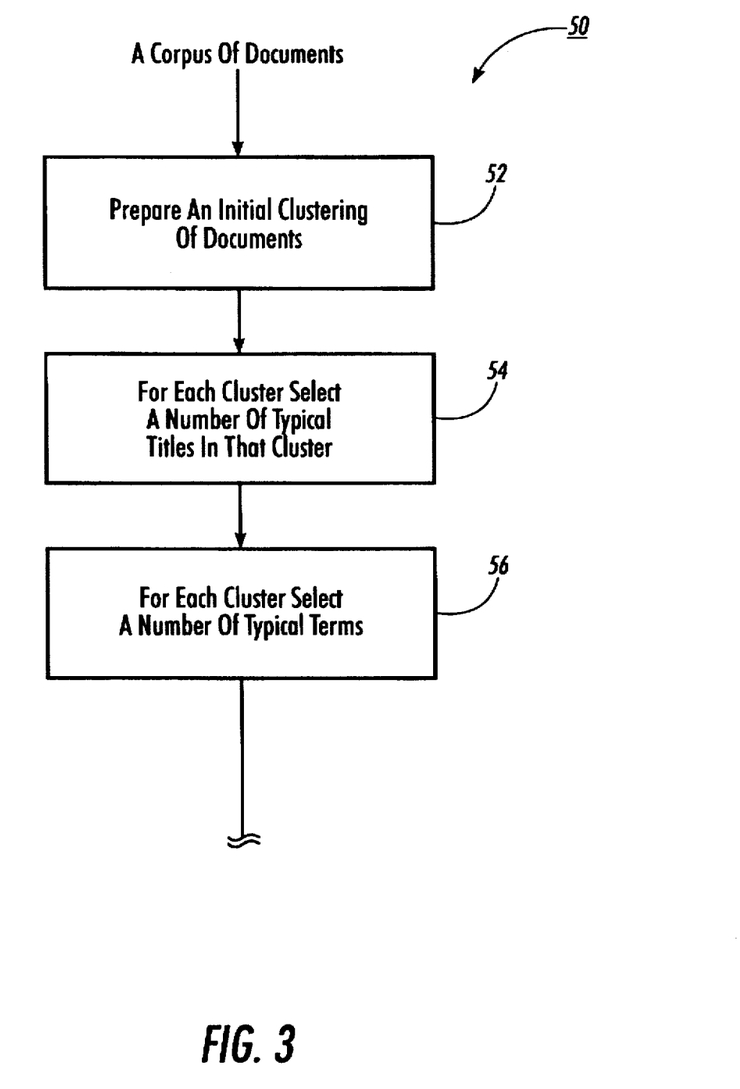
FIG. 3 illustrates a method of document cluster summarization.

FIG. 3 illustrates the major tasks performed prior to presenting cluster summaries to a computer user. First, during step 52 a corpus of documents are grouped into a set of k initial clusters. That is to say, the documents of the corpus are organized into k groups. That done, attention turns to generating a summary for each cluster. Each cluster summary preferably includes a list of typical, or representative, partial document titles and a list of frequent, or representative, terms. During step 54 processor 40 selects typical document titles for each document cluster. These titles may be selected in a number of ways. For example, titles can be selected based upon the proximity of their document's profile $\rho(d)$ to the cluster centroid, $\rho$. As used herein, a cluster centroid $\rho$ is a vector in which each scalar represents the average value of $\rho(d)$ within the cluster of each term $\omega$ of the appropriate lexicon V. Afterward, during step 56 typical terms are chosen to represent each cluster. Again, this can be done in a number of ways. One simple way is to select a number of the most frequently used terms within the documents of each cluster either by count, by proportion of the total number of occurrences of each term in the corpus, or by appearing in the cluster, or a combination of these criteria. This information is easily derived given countfiles, or profiles, and the terms of the appropriate lexicon.

Figure 4:
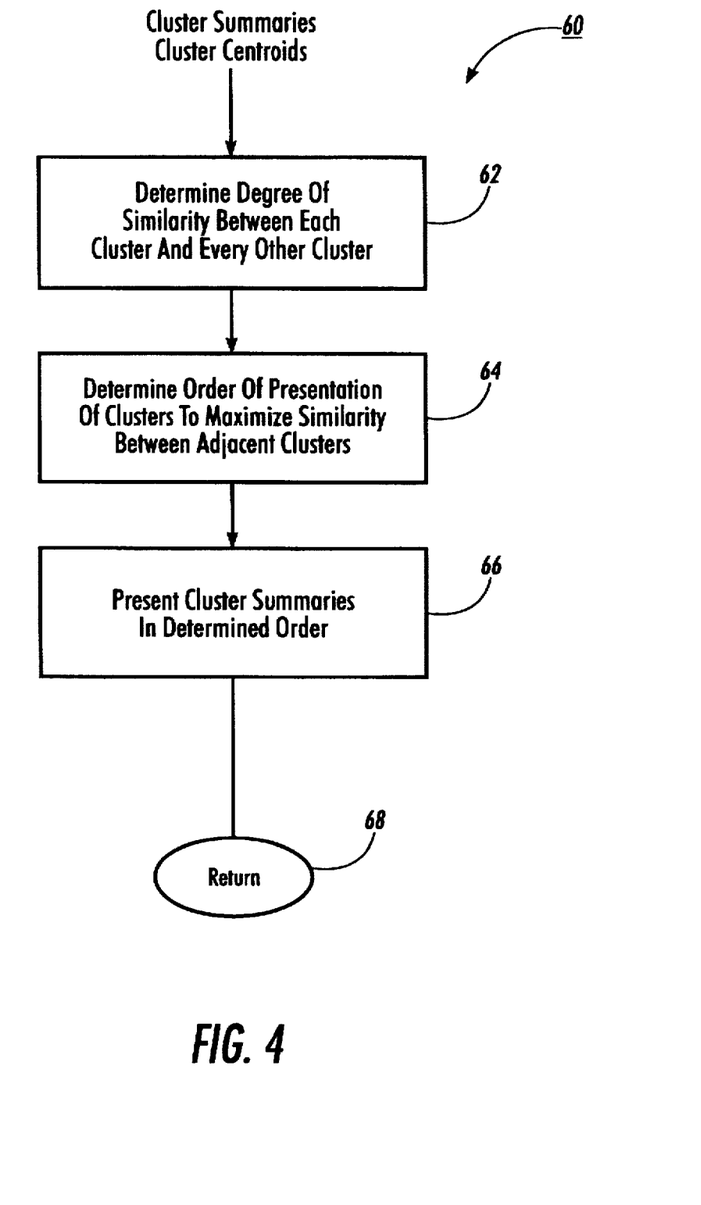
FIG. 4 illustrates a method of ordering document clusters for presentation in the absence of any user input.

C. Cluster Ordering in the Absence of Indications of Topics of Interest from the Computer User FIG. 4 illustrates in flow diagram form the instructions 60 executed by processor 40 to determine a logical order to present cluster summaries in the absence of any indication from a computer user about the user's interests. Instructions 60 may be stored in solid state memory 42 or on a floppy disk placed in disk drive 34. Instructions may be realized in any computer language including, LISP and C++.

Briefly described, instructions 60 determine the order of cluster presentation by determining the degree of similarity between each cluster and every other cluster. In one embodiment this information is used to numerically order the clusters so that when presented in numerical order the degree of similarity between adjacent clusters is substantially maximized. In an alternate embodiment, the ordering of clusters is chosen to force pairs of clusters distant from each other to be dissimilar to each other.

Execution of instructions 60 is initiated in the absence of any indication from the computer user about documents of particular interest upon receipt of cluster summaries and cluster centroids. In response to initiation, processor 40 branches to step 62. During step 62 processor 40 determines the degree of similarity between each cluster and every other cluster. According to instructions 60, cluster similarity is measured by the dot product between cluster centroids. In other words, the similarity between clusters $\rho_i$ and $\rho_j$ can be expressed as $(\rho_i \cdot \rho_j)$. Afterward, processor 40 branches from step 62 to step 64.

During step 64 processor 40 takes the similarity measurements of step 62 and assigns numbers to the clusters such that when presented in numerical order the degree of similarity between adjacent clusters is maximized. This can be done by treating the problem as an instance of the traveling salesman problem in which the distance to be traveled between adjacent clusters $C_i$ and $C_j$ is $(1-(\rho_i \cdot \rho_j))$. Approaches to solving the traveling salesman problem are well known and will not be discussed in detail herein. One recent work treating the Traveling Salesman Problem is *The Traveling Salesman Problem: A Guided Tour of Combinatorial Optimization*, edited by Lawler et al. Chapter 4 of that work is incorporated herein by reference. Given that the number of clusters k is small, an exact solution, or an accurate approximation of the solution, to the traveling salesman problem is not computationally expensive using standard heuristics. After solving the problem, a linear ordering of the clusters can be generated by breaking the cycle at the point of greatest dissimilarity between adjacent clusters.

Other algorithms also can be used to determine cluster ordering, including "greedy closeness" algorithms that add one link at a time, linking the clusters of the most similar, eligible pair of clusters. "Greedy distance" algorithms can also be used to order the clusters. These algorithms build up ordered subsets of the clusters by iteratively finding the centroid of the clusters furthest from the clusters already placed in the subset, and placing that cluster where its centroid is closest to the centroids already in the list.

Having determined the ordering, processor 40 branches from step 64 to step 66. Processor 40 then presents the cluster summaries in the order determined previously. The document summaries may be presented to the user via monitor 22, printer 24 and/or stored to solid state memory 42 for later display. Cluster presentation complete, processor 40 branches from step 66 to step 68, returning control to the routine that called instructions 60.

D. Cluster Ordering Given External Information

1. Cluster Ordering Based on Document Rank

Figure 5:
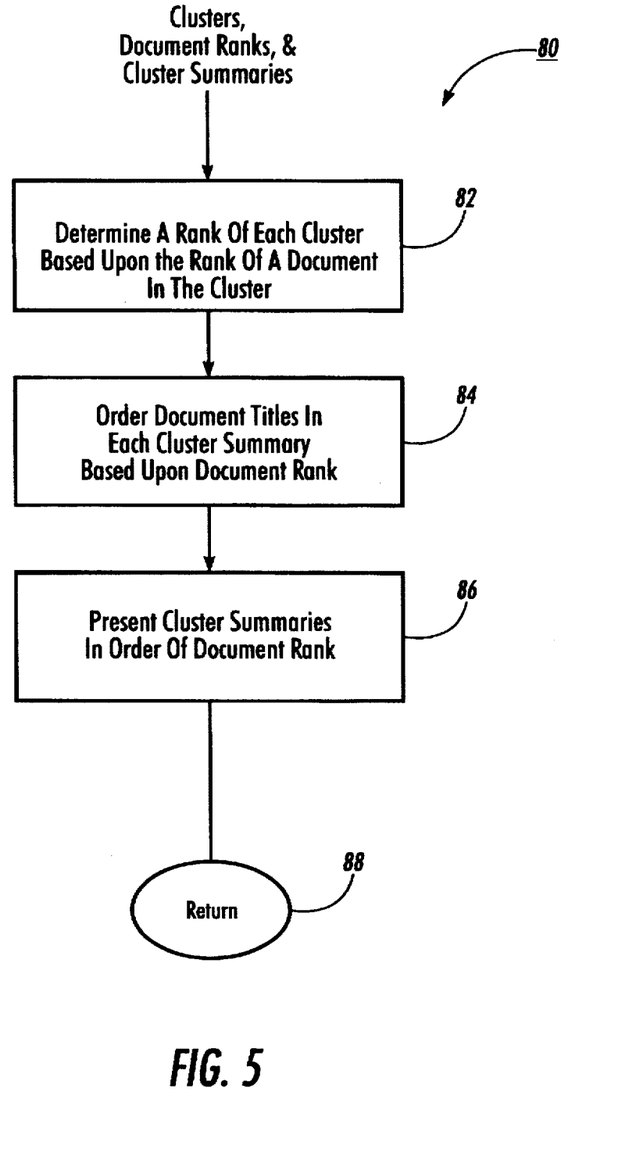
FIG. 5 illustrates a method of ordering document clusters for presentation when document rankings are provided.

FIG. 5 illustrates in flow diagram form the instructions 80 executed by processor 40 to determine a logical order to present cluster summaries when the documents of the corpus have been ranked, often with ties, on the basis of previous search histories, either those of the user or by a member of a group whose interests are believed to be similar to that of the present user. This ranking may reflect accumulated data on documents finally selected in earlier searches. Alternatively, the ranking may reflect the scoring inherent in a similarity search. (See G. Salton and M. J. McGill, "Introduction to Modern Information Retrieval", McGraw-Hill 1983, for a discussion of similarity searches.)

Instructions 80 determine an order of presentation given a prior user query, which is used as an indication of the computer user's interests. Briefly described, instructions 80 determine the order of cluster presentation using document rank to determine a cluster rank. Ties between ranked clusters may be broken by treating the tied clusters in the manner discussed previously with respect to FIG. 4 and instructions 60. Cluster summaries are then presented to the computer user in the resulting rank order. Instructions 80 may be stored in solid state memory 42 or on a floppy disk placed in disk drive 34. Instructions may be realized in any computer language including, LISP and C++.

Execution of instructions 80 is initiated upon receipt of a ranked, tie-broken, and clustered document corpus. Processor 40 responds to initiation by advancing to step 82. During step 82 processor 40 determines a rank for each cluster based upon the rank of a document d within that cluster. In one embodiment, the rank r of cluster $C_i$ is equal to the rank of the cluster's most desirable document r(d). That is to say, if low rankings are defined as desirable, then the rank of the cluster will be set to that of the cluster's lowest ranking document. Stated mathematically:

$$r(C_i) = \min r(d)$$

where $$d \in C_i.$$

Alternatively, other methods can be used during step 82 to determine cluster rank. For example, cluster rank can be set equal to the median document rank of a cluster, equal to the average document rank, or equal to the total rank of a subset of the lowest ranking documents in the cluster; e.g. the ten lowest ranking documents or the eighth or nonth lowest ranking documents.

Alternatively, other information can be used to rank clusters directly. Such information includes knowledge of the frequency of choices among the particular set of clusters being processed, or, more often, knowledge of choices by groups of similarly interested users. Again, ties between ranked clusters can be broken using the method described previously with respect to FIG. 4 and instructions 60.

Having ranked the clusters, processor 40 branches to step 84 from step 82. During step 84 processor 40 uses document rank to determine the order of presentation for the document titles, which make up part of each cluster summary, and breaks ties between documents when necessary as discussed with respect to instructions 60. Processor 40 orders the presentation of the clusters so that within the cluster summaries the titles of documents with lower rankings are presented before those with higher rankings, step 84.

Alternatively during step 84 the summary of each cluster can be modified by replacing the partial titles that make up part of the summary with an equal number of partial titles from the documents in the cluster that have the lowest ranks. Ties between documents having the same rank can be broken in the manner previously discussed. As before, the partial titles of documents with lower ranks are presented before those with higher ranks. Processor 40 then branches from step 84 to step 86.

Having determined the order of presentation of partial titles within each summary during step 84, processor 40 advances to step 86. During that step processor 40 presents the cluster summaries in cluster rank order. The document summaries may be presented to the user via monitor 22, printer 24 and/or stored to solid state memory 42 for later display. Cluster presentation complete, processor 40 branches from step 86 to step 88, returning control to the routine that called instructions 80.

2. Cluster Ordering Based on Binary Document Scores

Figure 6:
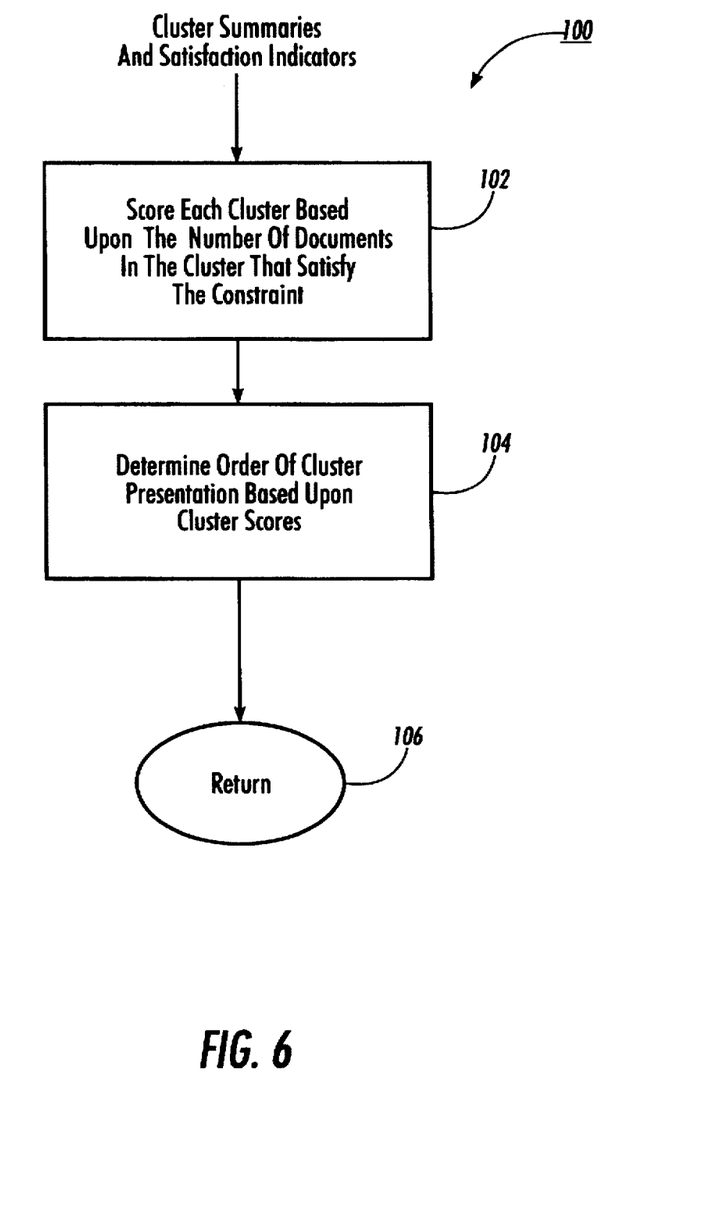
FIG. 6 illustrates a method of ordering document clusters for presentation when document satisfaction indicators are available.

FIG. 6 illustrates in flow diagram form the instructions 100 executed by processor 40 to determine an order to present cluster summaries when a boolean constraint, preferably structured as a combination of partial constraints, has been applied to the document corpus by the computer user. That is to say, instructions 100 treat satisfaction of the boolean constraint as an indication of the computer user's interest in a particular document, which is then used to order the document clusters for presentation. Instructions 100 may be stored in solid state memory 42 or on a floppy disk placed in disk drive 34. Instructions may be realized in any computer language including, LISP and C++.

Execution of instructions 100 is initiated upon receipt of a clustered document corpus, and satisfaction indicators, l(d), which indicate for each document whether that document satisfies the user's boolean constraint. Processor 40 responds to initiation by advancing to step 102.

During step 102 processor 40 calculates a score for each cluster based upon the number of documents with the cluster that satisfy the boolean constraint. If when a document d satisfies the computer user's boolean constraint l(d)=1, and if l(d)=0 when document d does not satisfy the boolean constraint, then the score s for a cluster $C_i$ can be calculated in a number of ways. In one embodiment, the cluster score is the sum of satisfaction indicators for that cluster. Stated mathematically:

$$s(C_i) = \Sigma l(d)$$

where $d \in C_i$.

In yet another embodiment, the cluster score can be calculated as the sum of satisfaction indicators divided by the number of documents in the cluster:

$$s(C_i) = \Sigma I(d) I \, |C_i|$$

where $|C_i|$ is the number of documents in $C_i$.

If the total number of documents that satisfy the boolean constraint in any particular set of clusters is too small, say less than 25, the ranking process should be modified to consider those documents that only partially satisfy the boolean constraint. In such circumstances, if the boolean constraint requires concatenations of two parts, B and C, then the score for each cluster can be taken as the lesser of the number of documents satisfying B and the number of documents satisfying C, or some other combination of the two numbers. The generalization to k partials is immediate.

Having scored all the clusters, processor 40 branches from step 102 to step 104. During step 104 processor 40 uses the cluster scores previously generated to determine the order of cluster presentation and then presents the cluster summaries in that order. Processor 40 presents first the cluster including the greatest number of documents satisfying the boolean constraint, next the cluster including the second greatest number of documents satisfying the boolean constraint, and so on. The document summaries may be presented via monitor 22, printer 24 and/or stored to solid state memory 42 for later display. Cluster presentation complete, processor 40 branches from step 104 to step 106, returning control to the routine that called instructions 100.

E. Conclusion

Thus, a method has been described for determining cluster ordering for presentation to a computer user in a way that emphasizes topic similarity. The method uses similarity between clusters to order their presentation in the absence of any information about topics of interest to the computer user.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A method of ordering document clusters for presentation after browsing a corpus of documents using a computer including a processor and a memory coupled to the processor, the processor implementing the method by executing instructions stored in the memory, the method comprising the steps of:
   a) grouping the corpus into a plurality of clusters, each cluster having a centroid including at least one document;
   b) determining for each cluster a degree of similarity between the cluster and every other cluster by finding a dot product between the cluster centroid and every other cluster centroid;
   c) determining an order of presentation of the plurality of clusters based upon the degree of similarity between clusters to maximize the degree of similarity between adjacent clusters; and
   d) presenting a number of the plurality of clusters to the computer user in the order of presentation.

2. The method of claim 1 further comprising the step of:
   e) generating a summary for each cluster.

3. The method of claim 2 wherein each summary includes a number of typical titles of documents within the cluster.

4. The method of claim 2 wherein each summary includes a number of frequently used terms within the cluster.

5. The method of claim 1 further comprising the step of:
   e) generating a summary for each cluster.

6. The method of claim 5 wherein each summary includes a number of typical titles of documents within the cluster.

7. The method of claim 6 wherein each summary includes a number of frequently used terms within the cluster.

8. A method of ordering document clusters for presentation after browsing a corpus of documents using a computer including a processor and a memory coupled to the processor, the processor implementing the method by executing instructions stored in the memory, the method comprising the steps of:
   a) grouping the corpus into a plurality of clusters, each cluster having a centroid and including at least one document, and each document including a rank generated in response to a query of the computer user;
   b) generating a cluster summary for each of the plurality of clusters;
   c) if there has been no external input indicative of topics of interest to the computer user determining for each cluster a degree of similarity between the cluster and every other cluster by finding a dot product between the cluster centroid and every other cluster centroid;
   d) determining an order of presentation of the plurality of clusters based upon the degree of similarity between clusters to maximize the degree of similarity between adjacent clusters; and
   e) presenting the plurality of clusters to the computer user in the order of presentation.

9. The method of claim 8 wherein each summary includes a number of typical titles of documents within the cluster.

10. The method of claim 9 wherein each summary includes a number of frequently used terms within the cluster.

11. An article of manufacture comprising:
   a) a memory; and
   b) instructions stored by the memory, the instructions representing a method of ordering document clusters in the absence of knowledge of user interests, the method of comprising the steps of:
      1) grouping the corpus into a plurality of clusters, each cluster having a centroid and including at least one document, and each document including a rank generated in response to a query of the computer user;
      2) if there has been no external input indicative of topics of interest to the computer user determining for each cluster a degree of similarity between the cluster and every other cluster by finding a dot product between the cluster centroid and every other cluster centroid;
      3) determining an order of presentation of the plurality of clusters based upon the degree of similarity between clusters; and
      4) presenting the plurality of clusters to the computer user in the order of presentation.

* * * * *